(12) United States Patent
Lin

(10) Patent No.: US 8,392,620 B2
(45) Date of Patent: Mar. 5, 2013

(54) ACCELERATED ACCESS APPARATUS AND READING AND WRITING METHODS THEREOF

(75) Inventor: Jin-min Lin, Taipei (TW)

(73) Assignee: Genesys Logic, Inc., Shindian (TW)

(*) Notice: Subject to any disclaimer, the term of this patent is extended or adjusted under 35 U.S.C. 154(b) by 351 days.

(21) Appl. No.: 12/643,941

(22) Filed: Dec. 21, 2009

(65) Prior Publication Data

US 2011/0099296 A1    Apr. 28, 2011

(30) Foreign Application Priority Data

Oct. 27, 2009   (TW) .................................. 098136373

(51) Int. Cl.
*G06F 3/00* (2006.01)
(52) U.S. Cl. ............................................................ 710/4
(58) Field of Classification Search ...................... 710/4
See application file for complete search history.

(56) References Cited

U.S. PATENT DOCUMENTS

| | | | |
|---|---|---|---|
| 6,862,657 B1* | 3/2005 | Grimsrud et al. | 711/112 |
| 2004/0177178 A1* | 9/2004 | Gregg et al. | 710/52 |
| 2010/0023694 A1* | 1/2010 | Ozaki | 711/119 |

* cited by examiner

*Primary Examiner* — Idriss N Alrobaye
*Assistant Examiner* — Brooke Taylor

(57) ABSTRACT

An accelerated access apparatus and reading and writing methods thereof are described. A processing unit is used to determine whether the continuation state of a plurality of first address parameters of first request signals. Each first request signal has a first address length. When the first address parameters are continuous thereamong, the processing unit converts one of the second request signals into a second reading command which has a second reading address and a second reading address length. The second reading address length is greater than one of the first address lengths. The processing unit executes the second reading command to read data content to be stored in a buffer unit based on the second reading address and the second reading address length for responding to the second request signals.

18 Claims, 8 Drawing Sheets

ACCELERATED ACCESS APPARATUS AND READING AND WRITING METHODS THEREOF

CLAIM OF PRIORITY

This application claims priority to Taiwanese Patent Application No. 098136373 filed on Oct. 27, 2009.

FIELD OF THE INVENTION

The present invention relates to an access apparatus and methods thereof, and more particularly relates to an accelerated access apparatus and reading and writing methods thereof suitable for a storage system based on a universal serial bus (USB) protocol.

BACKGROUND OF THE INVENTION

Please refer to FIG. 1. FIG. 1 shows a schematic block diagram of a conventional storage system 100 having a universal serial bus (USB) protocol. The storage system 100 includes a disk driver 102, a storage class driver 104 and USB driver 106. The storage system 100 is coupled to the USB storage 108. When the storage system 100 accesses the USB storage 108, the disk driver 102 transmits an input/output request packet (IRP) to the storage class driver 104 so that the USB driver 106 generates a USB request block (URB) message to access the data stored in the USB storage 108 via the URB message. Each of the IRPs corresponds to a URB message and an address, e.g. one of address "A_1" through "A_n". In addition, there is data I/O between the USB driver 106 and the USB storage 108. However, the disadvantage of the storage system 100 is that each of the IRPs generates a URB message, i.e. one of URB messages "URB_1" through "URB_n". Further, each URB message is transmitted to the USB driver 106 based on the format of command ("C_1" through "C_n"), data and status ("S_1" through "S_n"). When the data transmission is increased between the disk driver 102 and the USB storage 108, it takes a lot of transmission time to transfer the commands and statuses. Specifically, when the data with smaller address length are transmitted, it wastes a lot of transmission time. Consequently, there is a need to improve the transmission rate of the storage system.

SUMMARY OF THE INVENTION

One objective of the present invention is to provide an accelerated access apparatus and reading and writing methods thereof to accelerate the data reading and writing speed of the storage system.

According to the above objectives, the present invention sets forth an accelerated access apparatus and reading and writing methods thereof. The accelerated access apparatus includes a disk driver, a storage driver having a processing unit and a buffer unit, and a bus driver. The accelerated reading method includes the steps of:

(1) The disk driver transmits a plurality of first request signals and a plurality of second request signals wherein each of the first request signals has a first address parameter which corresponds an access address of a first data message and has a first address length which represents the size of the first data message, and each of the second request signals has a second address parameter which corresponds an access address of a second data message and has a second address length which represents the size of the second data message.

(2) The processing unit converts the first request signals into a plurality of reading commands correspondingly wherein each of the reading commands has the first address parameter and the first address length correspondingly.

(3) The processing unit executes the first reading commands for reading the first data messages in the storage device to the disk driver based on the first address parameters and the first address lengths.

(4) The processing unit reports a plurality of first statuses by the storage device to the processing unit and storing the first statuses in the buffer unit wherein each of the first statuses corresponds to the first reading commands and the first data messages respectively to allow the storage device to respond the first request signals correspondingly.

(5) The processing unit finds the continuation state among the first address parameters and the second address parameter of the first one of the second request signals for determining whether an accelerated reading mode of the storage device starts.

(6) The processing unit starts the accelerated reading mode of the storage device when the first address parameters are in the continuation state and the second address parameter of the first one of the second request signals and the first address parameter of the last one of the first request signals is in the continuation state.

(7) The processing unit converts the first one of the second request signals into a second reading command wherein the second reading command has a second reading address and a second reading address length correspondingly, and the second reading address length is greater than each of the first address lengths.

(8) The processing unit executes the second reading command for reading the second data messages in the storage device to be stored in the buffer unit via the bus driver based on the second reading address and the second reading address length, wherein the processing unit responds the second request signals.

(9) The processing unit reports a second status by the storage device to the processing unit and storing the second status in the buffer unit wherein the second status corresponds to the second reading command and the second data messages respectively.

The accelerated writing method includes the steps of:

(1) The disk driver transmits a plurality of request signals to the processing unit wherein each of the request signals has an address parameter and an address length which corresponds to a data message and wherein each of the address parameters corresponds an access address of the message and each of the address lengths represents the size of each of the data messages.

(2) The processing unit receives the address parameters and the address lengths for responding to the request signals respectively, and stores the data messages in the buffer unit.

(3) The processing unit converts the first one of the request signals into a writing command when the buffer unit is completely written by the data messages wherein the writing command has a writing address and an address length and the writing address length is greater than each of the address lengths of each of the request signals.

(4) The processing unit executes the writing command for writing the completely written data messages in the buffer unit to the storage device based on the writing address and the writing address length via the bus driver.

(5) The processing unit receives a status of the storage device via the bus driver and storing the status in the buffer unit by the processing unit, wherein the status corresponds to the writing command and the data messages respectively.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
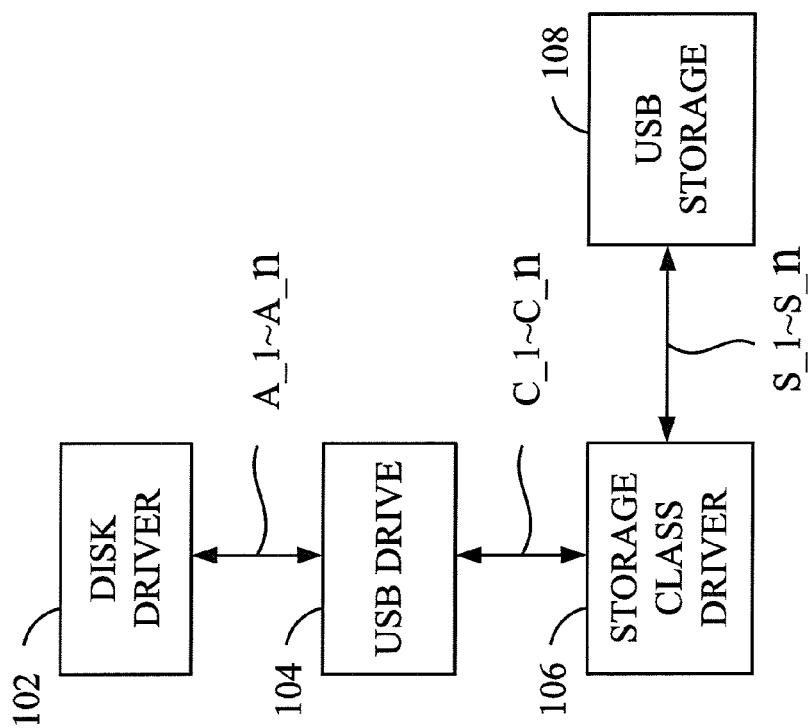
FIG. 1 is a schematic block diagram of a conventional storage system having a universal serial bus (USB) protocol.
Figure 2A:
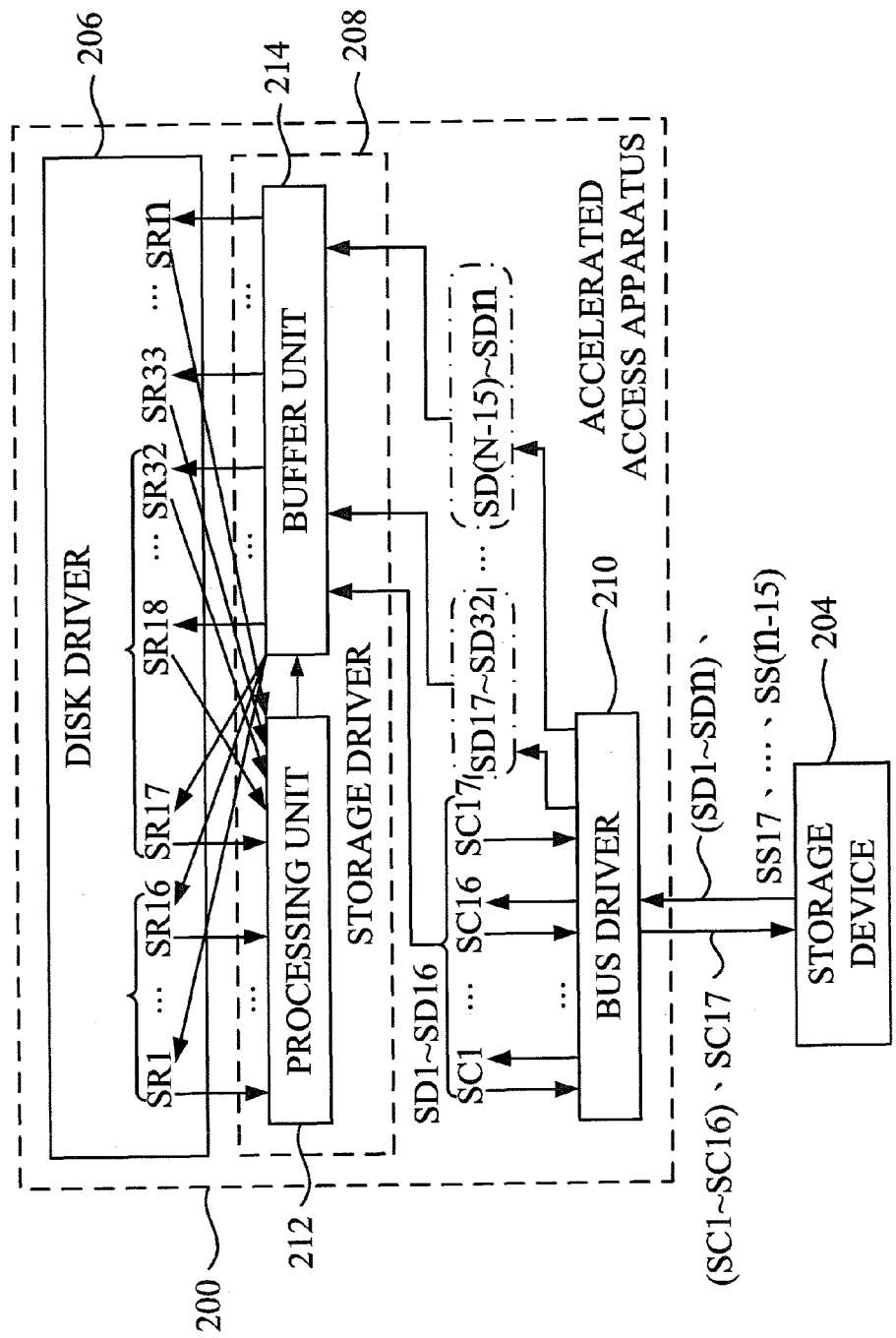
FIG. 2A is a schematic view of an accelerated access apparatus for reading the data messages in the storage device according to one embodiment of the present invention.
Figure 2B:
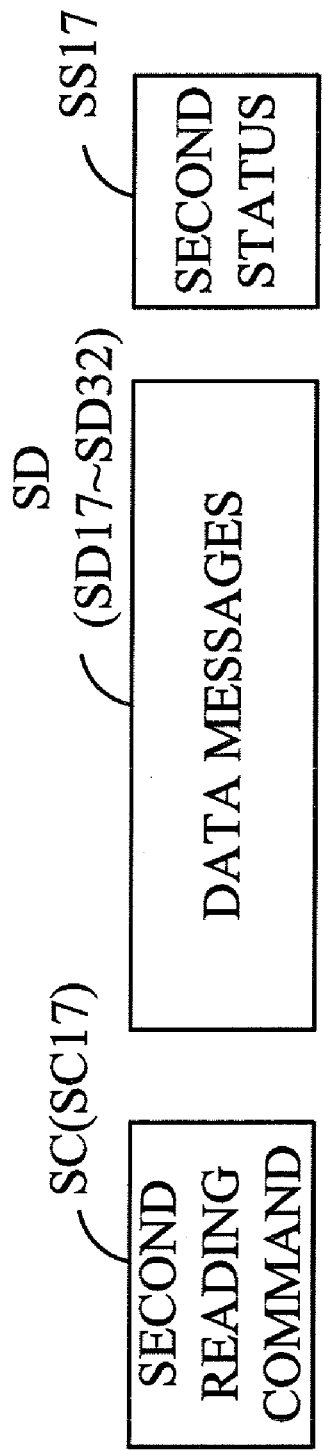
FIG. 2B is a schematic view of the data messages read by the accelerated access apparatus in FIG. 2A according to one embodiment of the present invention.

Please refer to FIG. 2A and FIG. 2B. FIG. 2A is a schematic view of an accelerated access apparatus 200 for reading the data messages in the storage device 204 according to one embodiment of the present invention. FIG. 2B is a schematic view of the data messages read by the accelerated access apparatus 200 in FIG. 2A according to one embodiment of the present invention. The accelerated access apparatus 200 rapidly reads a plurality of data messages in a storage device 204 of the storage system 202. The accelerated access apparatus 200 is coupled to the storage device 204, such as flash memory. The accelerated access apparatus 200 includes a disk driver 206, a storage driver 208 and a bus driver 210. The disk driver 206 is coupled to the storage driver 208 and the storage driver 208 is coupled to the bus driver 210. The bus driver 210 couples the storage driver 208 to the storage device 204. The storage driver 208 includes the processing unit 212 and a buffer unit 214. The processing unit 212 and the buffer unit 214 respectively couple the disk driver 206 to the storage device 204 via the bus driver 210.

The disk driver 206 transmits a plurality of first request signals (SR1~SR16) and a plurality of second request signals (SR17~SR32) wherein each of the first request signals (SR1~SR16) has a first address parameter which corresponds an access address of a first data message (SD1~SD16) and has a first address length which represents the size of the first data message (SD1~SD16), and each of the second request signals (SR17~SR32) has a second address parameter which corresponds an access address of a second data message (SD17~SD32) and has a second address length which represents the size of the second data message (SD17~SD32). In one embodiment, the first address parameter and the second address parameter are logical block address (LBA) parameters and correspond to the physical block address (PBA) of the storage device 204. In this case, the amounts of the first request signals and the second request signals are sixteen respectively. It should be noted that arbitrary amount of first request signals and second request signals can be applicable to the accelerated access apparatus 200.

The processing unit 212 converts the first request signals (SR1~SR16) into a plurality of first reading commands (SC1~SC16) correspondingly, wherein each of the first reading commands (SC1~SC16) has the first address parameter and the first address length correspondingly. The processing unit 212 executes the first reading commands (SC1~SC16) for reading the first data messages (SD1~SD16) in the storage device 204 to the disk driver 206 based on the first address parameters and the first address lengths. The storage device 204 reports a plurality of first statuses (SS1~SS16) to the processing unit 212 and the processing unit 212 stores the first statuses (SS1~SS16) in the buffer unit 214 wherein each of the first statuses (SS1~SS16) corresponds to the first reading commands (SC1~SC16) and the first data messages (SD1~SD16) respectively to allow the storage device 204 to respond the first request signals (SR1~SR16) correspondingly. The buffer unit 214 stores the first data messages (SD1~SD16), the first statuses (SS1~SS16), the second data messages (SD17~SD32) and the second statuses (SS17~SS32). The first statuses (SS1~SS16) indicates whether the accelerated access apparatus 200 successfully accesses the storage device 204.

The processing unit 212 finds the continuation state among the first address parameters and the second address parameter of the first one of the second request signals (SR17~SR32) for determining whether an accelerated reading mode of the storage device 204 starts. The accelerated reading mode of the storage device 204 is started when the first address parameters are in the continuation state and the second address parameter of the first one of the second request signals (SR17~SR32) and the first address parameter of the last one of the first request signals (SR1~SR16) is in the continuation state. The processing unit 212 converts the first one of the second request signals (SR17~SR32) into a second reading command (SC17) wherein the second reading command (SC17) has a second reading address and a second reading address length correspondingly and the second reading length is greater than each of the first address lengths. The processing unit 212 executes the second reading command (SC17) for reading the second data messages (SD17~SD32) in the storage device 204 to be stored in the buffer unit 214 via the bus driver 210 based on the second reading address and the second reading address length wherein the processing unit 212 responds the second request signals (SR17~SR32). The storage device 204 reports a second status (SS17) to the processing unit 212 and the processing unit 212 stores the second status (SS17) in the buffer unit 214 wherein the second status (SS17) corresponds to the second reading command (SC17) and the second data messages (SD17~SD32) respectively.

The processing unit 212 starts a standard reading mode of the storage device 204 when the second address parameter of the first one of the second request signals (SR17~SR32) and the first address parameter of the last one of the first request signals (SR1~SR16) is not in the continuation state. The processing unit 212 converts the first one of the second request signals into a third reading command (SC17') wherein the third reading command (SC17') corresponds to the second reading address and the second reading address length and the third reading command (SC17') has a third reading address length which is equal to the first address length. The processing unit 212 executes the third reading command (SC17') for reading the second data message (SD17) in the storage device 204 to be stored in the disk driver 206 based on the second address parameter and the third reading address length, wherein the processing unit 212 responds the first one of the second request signals (SR17~SR32).

The processing unit 212 determines the continuation state from the second one of the second address parameters to the last one of the second address parameters, and each of the second request signals (SR17~SR32) corresponds to each of the second data messages (SD17~SD32) in the buffer unit 214 when the continuation state from the second one of the second address parameters to the last one of the second address parameters is ascertained. When the current second address parameter and the previous second address parameter are not in the continuation state, the processing unit 212 converts the current second request signal corresponding to the current second address parameter into a fourth reading command (SC20') wherein the fourth reading command (SC20') corresponds to the second address parameter and the second address length of the current second request signal and the fourth reading command (SC20') has a fourth reading address length which is equal to the first address length. The processing unit 212 executes the fourth reading command for reading the second data message (SD20) in the storage device 204 to be stored in the disk driver 206 based on the second address parameter and the second address length.

The disk driver 206 transmits a third request signal (SR33) and the third request signal (SR33) has a third address parameter and a third address length. The processing unit 212 finds the continuation state among the second address parameter of the last one (SR32) of the second request signals and the third address parameter of the third request signal (SR33) for determining whether the accelerated reading mode starts continuously. The processing unit 212 continuously starts the accelerated reading mode for reading a third data message (SD33) in the storage device 204 to be stored in the buffer unit 214 based on the third address parameter and for responding the third request signal (SR33) when the continuation state among the second address parameter of the last one (SR32) of the second request signals and the third address parameter of the third request signal (SR33) is ascertained. The processing unit 212 converts the third request signal (SR33) into a fifth reading command (SC33) when the second address parameter of the last one (SR32) of the second request signals and the third address parameter of the third request signal (SR33) are not in the continuation state wherein the fifth reading command (SC33) has a fifth reading address and a fifth reading address length. The processing unit 212 reads the third data message (SD33') to be stored in the buffer unit 214 based on the fifth reading address for responding the third request signal (SR33) wherein the fifth reading length is greater than the first address length.

The storage device 204 reports a third status (SS33) to the processing unit 212 and the processing unit 212 stores the third status (SS33) in the buffer unit 214 wherein the third status (SS33) corresponds to the third data message (SD33).

Figure 2C:
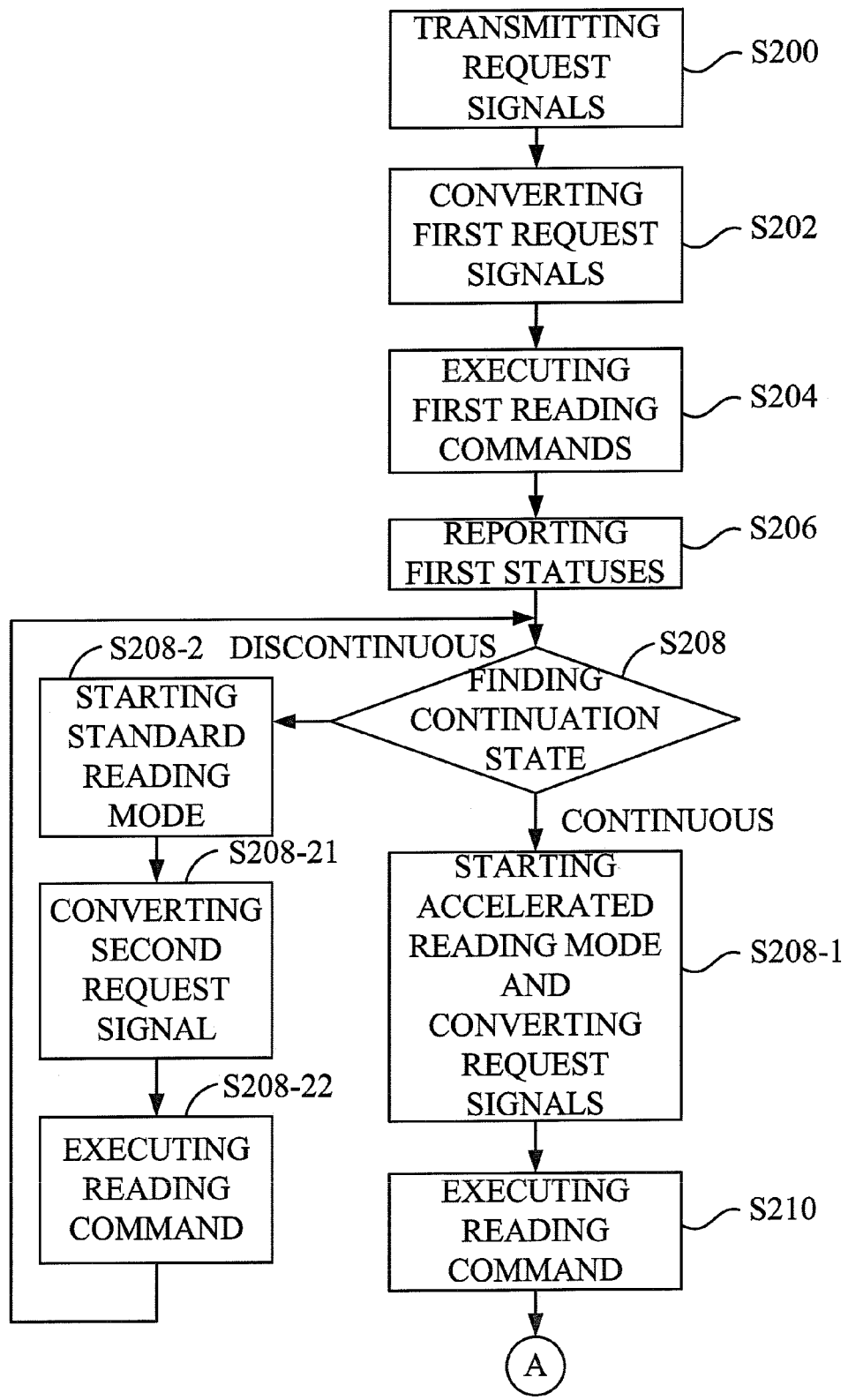
FIGS. 2C-2D are the flow charts of reading the data messages stored in the storage device by the accelerated access apparatus in FIG. 2A according to one embodiment of the present invention.
Figure 2D:
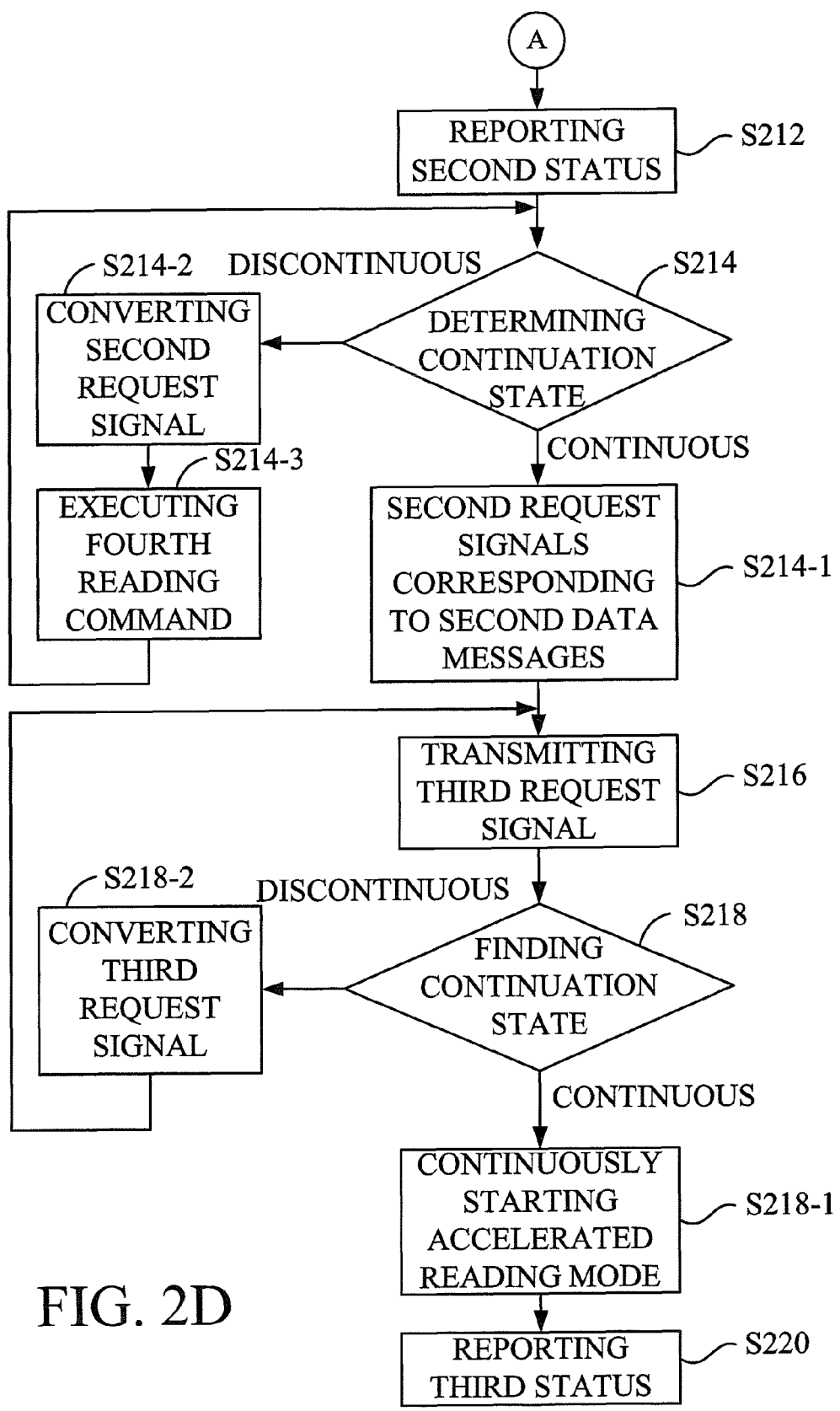

Please refer to FIG. 2A, FIG. 2B and FIGS. 2C-2D. FIGS. 2C-2D are the flow charts of reading the data messages stored in the storage device 204 by the accelerated access apparatus 200 in FIG. 2A according to one embodiment of the present invention. The accelerated reading method is used to rapidly read a plurality of data messages in a storage device 204 wherein the accelerated access apparatus includes a disk river 206, a processing unit 212, a buffer unit 214 and a bus driver 210. The accelerated reading method comprises the following steps of:

In step S200, the disk driver 206 transmits a plurality of first request signals (SR1~SR16) and a plurality of second request signals (SR17~SR32) wherein each of the first request signals (SR1~SR16) has a first address parameter which corresponds an access address of a first data message (SD1~SD16) and has a first address length which represents the size of the first data message (SD1~SD16), and each of the second request signals (SR17~SR32) has a second address parameter which corresponds an access address of a second data message (SD17~SD32) and has a second address length which represents the size of the second data message (SD17~SD32).

In step S202, the processing unit 212 converts the first request signals (SR1~SR16) into a plurality of first reading commands (SC1~SC16) correspondingly wherein each of the reading commands (SC1~SC16) has the first address parameter and the first address length correspondingly.

In step S204, the processing unit 212 executes the first reading commands for reading the first data messages (SD1~SD16) in the storage device 204 to the disk driver 206 based on the first address parameters and the first address lengths.

In step S206, the storage device 204 reports a plurality of first statuses (SS1~SS16) to the processing unit 212 and the processing unit 212 stores the first statuses (SS1~SS16) in the buffer unit 214 wherein each of the first statuses (SS1~SS16) corresponds to the first reading commands (SC1~SC16) and the first data messages (SD1~SD16) respectively to allow the storage device 204 to respond the first request signals (SR1~SR16) correspondingly.

In step S208, the processing unit 212 finds the continuation state among the first address parameters and the second address parameter of the first one (SR17) of the second request signals (SR17~SR32) for determining whether an accelerated reading mode of the storage device 204 starts. When the first address parameters are in the continuation state and the second address parameter of the first one of the second request signals (SR17~SR32) and the first address parameter of the last one of the first request signals (SR1~SR16) is in the continuation state, proceed to the step S208-1. When the first address parameters are not in the continuation state, proceed to the step S208-2. In one embodiment, the processing unit 212 computes the sum of each of the first address parameters and each of the first address lengths correspondingly and determines whether the sum is equal to each of the next first address parameters, and the first address parameters are in the continuation state when the sum is equal to the next first address parameter. For example, the processing unit 212 computes the sum of the first address parameter and the first address length of the first request signal (SR1) and determines whether the sum is equal to the next first address parameter of the second one (SR2) of the second request signals until the continuation state of the rest of first address parameters are determined.

In step S208-1, the accelerated reading mode of the storage device 204 is started when the first address parameters are in the continuation state and the second address parameter of the first one of the second request signals (SR17~SR32) and the first address parameter of the last one of the first request signals (SR1~SR16) is in the continuation state. The processing unit 212 converts the first one of the second request signals (SR17~SR32) into a second reading command (SC17) wherein the second reading command (SC17) has a second reading address and a second reading address length correspondingly. In one preferred embodiment, the second reading address length is equal to the sum of the first address lengths of the first request signals (SR1~SR16) in the continuation state. Proceed to the step S210.

In step S208-2, a standard reading mode of the storage device 204 is started when the second address parameter of the first one (SR17) of the second request signals (SR17~SR32) and the first address parameter of the last one of the first request signals (SR1~SR16) is not in the continuation state. The standard reading mode further includes the steps of: In step S208-21, the processing unit 212 converts the first one of the second request signals (SR17~SR32) into a third reading command (SC17') wherein the third reading command (SC17') corresponds to the second reading address and the second reading address length, and the third reading command (SC17') has a third reading address length which is equal to the first address length. In step S208-22, the processing unit 212 executes the third reading command (SC17') for reading the second data message in the storage device 204 to be stored in the disk driver 206 based on the second address parameter and the third reading address length, wherein the processing unit 212 responds the first one (SR17) of the second request signals (SR17~SR32). Return to the step S208.

In step S210, the processing unit 212 executes the second reading command (SC17) for reading the second data messages (SD17~SD32) in the storage device 204 to be stored in the buffer unit 214 via the bus driver 210 based on the second reading address and the second reading address length, wherein the processing unit 212 responds the second request signals (SR17~SR32). In other words, when the second data message (SD18~SD32) is stored in the buffer unit 214, the disk driver 214 directly reads the second data message (SD18~SD32) to respond the second request signals (SR18~SR32).

In step S212, the storage device 204 reports a second status (SS17) to the processing unit 212 and the processing unit 212 stores the second status (SS17) in the buffer unit 214, wherein the second status (SS17) corresponds to the second reading command (SC17) and the second data messages (SD17~SD32) respectively.

In step S214, the processing unit 212 determines the continuation state from the second one of the second address parameters to the last one of the second address parameters. Each of the second request signals (SR17~SR32) corresponds to each of the second data messages when the continuation state from the second one of the second address parameters to the last one of the second address parameters is ascertained, as shown in the step S214-1. Proceed to the step S216. When the current second address parameter and the previous second address parameter are not in the continuation state during the step S214, proceed to the following steps of:

In step S214-2, the processing unit 212 converts the current second request signal corresponding to the current second address parameter into a fourth reading command (SC20'), wherein the fourth reading command (SC20') corresponds to the second address parameter and the second address length of the current second request signal, and the fourth reading command (SC20') has a fourth reading address length which is equal to the first address length.

In step S214-3, the processing unit 212 executes the fourth reading command (SC20') for reading the second data message in the storage device 204 to be stored in the disk driver 206 based on the second address parameter and the second address length. Proceed to the step S214.

In step S216, the disk driver 206 transmits a third request signal (SR33), wherein the third request signal (SR33) has a third address parameter and a third address length.

In step S218, the processing unit 212 finds the continuation state among the second address parameter of the last one (SR32) of the second request signals and the third address parameter of the third request signal (SR33) for determining whether the accelerated reading mode starts continuously.

In step S218-1, the processing unit 212 continuously starts the accelerated reading mode for reading a third data message (SD33) in the storage device 204 to be stored in the buffer unit 214 based on the third address parameter and responding the third request signal (SR33) when the continuation state among the second address parameter of the last one (SR32) of the second request signals and the third address parameter of the third request signal (SR33) is ascertained.

In step S218-2, the processing unit 212 converts the third request signal (SR33) into a fifth reading command (SC33) when the second address parameter of the last one (SR32) of the second request signals and the third address parameter of the third request signal (SR33) are not in the continuation state wherein the fifth reading command (SC33) has a fifth reading address and a fifth reading address length. The processing unit 212 reads the third data message to be stored in the buffer unit 214 based on the fifth reading address for responding the third request signal (SR33) wherein the fifth reading length is greater than the first address length.

In step S220, the storage device 204 reports a third status (SS33) to the processing unit 212 and the processing unit 212 stores the third status (SS33) in the buffer unit 214, wherein the third status (SS33) corresponds to the third data message (SD33).

In one embodiment, the bus driver 210 reads the first data messages, the first statuses, the second data messages, the second statuses, the third data messages and the third statuses based on the universal serial bus (USB) protocol.

According to the above-mentioned descriptions, the accelerated reading method utilizes the processing unit 212 to transmit a reading command, e.g. reading command SC17, to the storage device 204 and the processing unit 212 receives the statuses, e.g. statuses SS17 and S(n−15). That is, one reading command corresponds the data messages of a plurality of request signals so that the transmission time of the reading command and statuses thereof between the storage drive 208 and the bus driver 210 for accelerating the data transmission rate of the data message (SD1~SDn). Therefore, the accelerated access apparatus 200 is capable of increasing the data reading rate of the storage system 202.

Figure 3A:
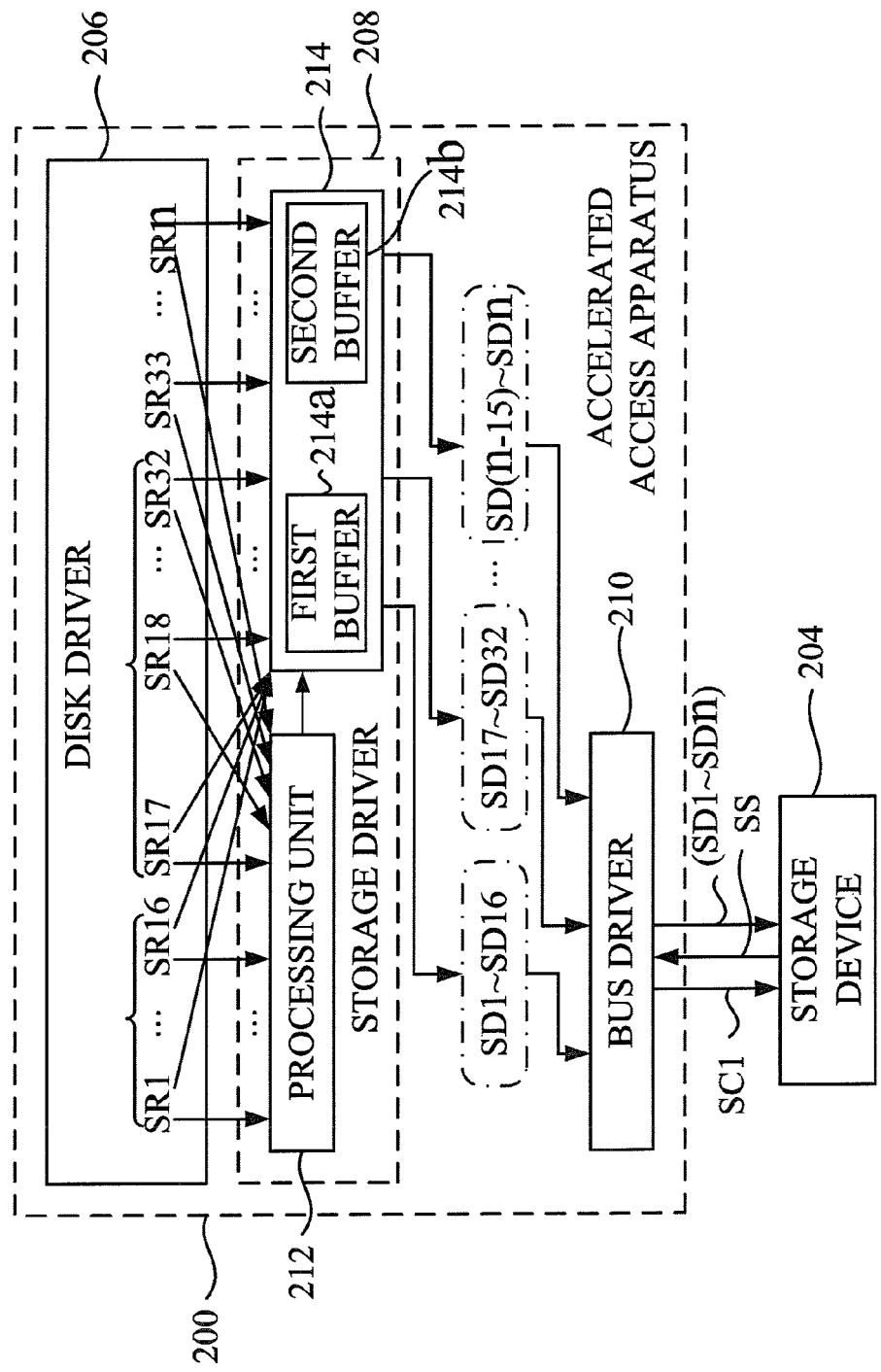
FIG. 3A is a schematic view of an accelerated access apparatus for writing the data messages to the storage device according to one embodiment of the present invention.
Figure 3B:
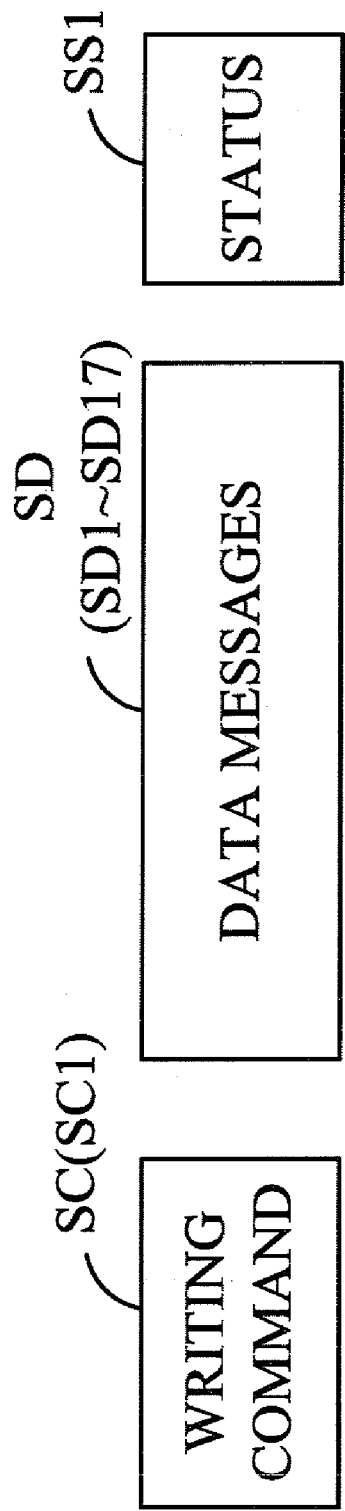
FIG. 3B is a schematic view of the data messages written by using the accelerated access apparatus in FIG. 3A according to one embodiment of the present invention.
Figure 3C:
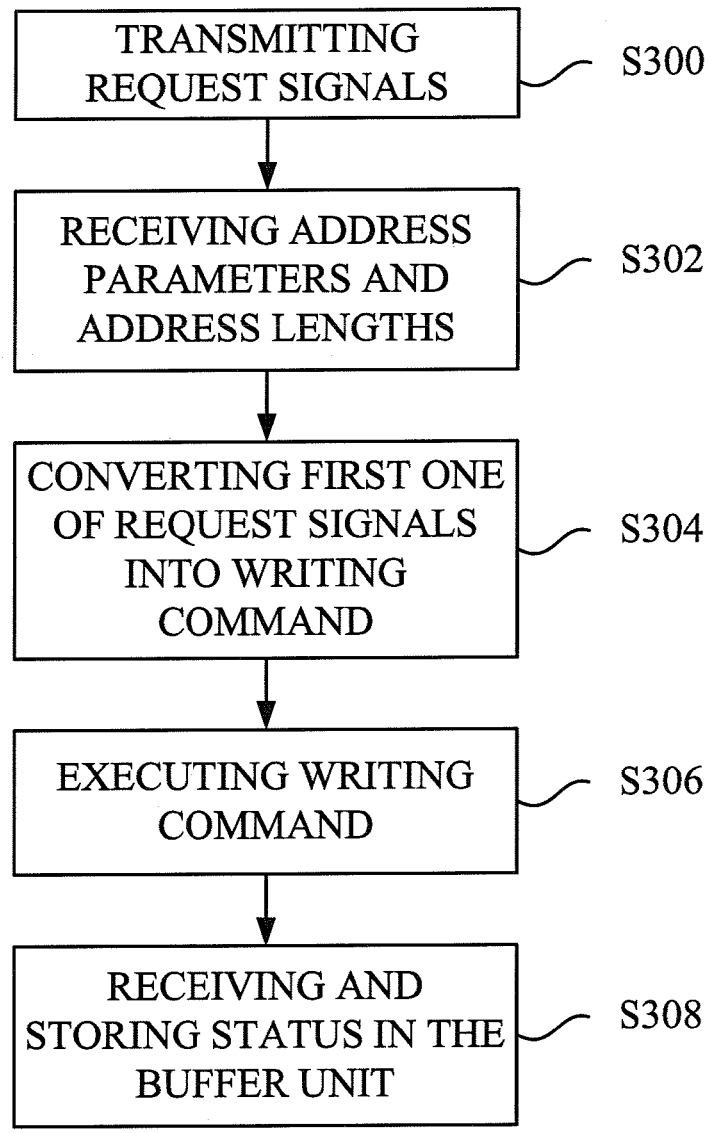
FIG. 3C is the flow chart of writing the data messages to the storage device by using the accelerated access apparatus in FIG. 3A according to one embodiment of the present invention.

Please refer to FIG. 3A-3C. FIG. 3A is a schematic view of an accelerated access apparatus for writing the data messages to the storage device according to one embodiment of the present invention. FIG. 3B is a schematic view of the data messages written by using the accelerated access apparatus in FIG. 3A according to one embodiment of the present invention. FIG. 3C is the flow chart of writing the data messages to the storage device by using the accelerated access apparatus in FIG. 3A according to one embodiment of the present invention. The accelerated writing method is used to rapidly write a plurality of data messages to a storage device 204 wherein the accelerated access apparatus includes a disk river 206, a processing unit 212, a buffer unit 214 and a bus driver 210. The buffer unit 214 has a first buffer 214a and a second buffer 214b. The accelerated reading method includes the steps of:

In step S300, the disk driver 206 transmits a plurality of request signals (SR1~SRn) to the processing unit 212 wherein each of the request signals (SR1~SRn) has an address parameter and an address length which corresponds to a data message and wherein each of the address parameters corresponds an access address of the data messages and each of the address lengths represents the size of each of the data messages (SD1~SDn).

In step S302, the processing unit 212 receives the address parameters and the address lengths for responding to the request signals (SR1~SRn) and stores the data messages (SD1~SDn) in the buffer unit 214.

In step S304, the processing unit 212 converts the first one (SR1) of the request signals (SR1~SRn) into a writing command when the buffer unit 214 is completely written by the data messages wherein the writing command has a writing address and an address length and the writing address length is greater than each of the address lengths of each of the request signals (SR1~SRn).

In step S306, the processing unit 212 executes the writing command for writing the completely written data messages in the buffer unit to the storage device 204 based on the writing address and the writing address length via the bus driver 210. The buffer unit 214 comprises a first buffer 214a and a second buffer 214b, and the processing unit 212 alternately writes the data messages to the first buffer 214a and the second buffer 214b by turns based on the continuation state among the address parameters. When each of the current address parameters and each of the next address parameters are in the continuation state, the processing unit 212 writes the data message of the current address parameters and the data messages of the next address parameters to the first buffer 214a until the first buffer 214a is completely written. In one embodiment, when the address parameters of the request signals SR1~SR16 are in the continuation state, the processing unit 212 writes the data message SD1~SD16 to the first buffer 214a. Similarly, when the address parameters of the request signals SR17~SR32 are in the continuation state, the processing unit 212 writes the data message SD17~SD32 to the first buffer 214a until the data message SD(n−15)~SDn of the request signals SR(n−15)~SRn are completely written to the first buffer 214a.

When each of the current address parameters and each of the next address parameters are not in the continuation state, the processing unit 212 writes the data message of the current address parameter to the first buffer 214a and writes the data message of the next address parameter to the second buffer 214b. In one embodiment, when the first buffer 214a is fully and completely written by the data messages, the processing unit 212 writes the data message in the first buffer 214a to be stored in the storage device 204. Meanwhile, the processing unit 212 controls the second buffer 214b to receive the request signals. For example, when the current address parameter of the request signal SR1 and the next address parameter of the request signal SR2 are not in the continuation state, the data message SD1 of the request signal SR1 is written to the first buffer 214a and the data message SD2 of the request signal SR2 is written to the second buffer 214b. In one preferred embodiment, the writing address length is equal to the sum of the address lengths of the address parameters in the continuation state. The first buffer 214a and/or the second buffer 214b corresponds the writing address length.

In step S308, the processing unit 212 receives a status of the storage device 204 via the bus driver 210 and stores the status in the buffer unit 214 wherein the status corresponds to the writing command and the data messages respectively.

The bus driver 210 receives the data messages and the statuses based on a universal serial bus (USB) protocol. The starting address of the address parameter is aligned to the boundary of an erasing unit of the storage device 204. For example, the starting addresses of the address parameters of the data messages SD1, SD17, ..., SD(n−15) are aligned to the boundaries of the erasing units of the storage device 204 for accelerating the writing rate of the data messages to the storage device 204. That is, when the erasing unit of the storage device 204 is integral times the address parameter, the writing rate of the data message to the storage device 204 is effectively increased.

According to the above-mentioned descriptions, the accelerated writing method utilizes the processing unit 212 to transmit a writing command, e.g. writing command SC17, to the storage device 204 and the processing unit 212 receives the statuses, e.g. statuses SS17 and S(n−15). That is, one writing command corresponds the data messages of a plurality of request signals so that the transmission time of the writing command and statuses thereof between the storage drive 208 and the bus driver 210 for accelerating the data transmission rate of the data message (SD1~SDn). Therefore, the accelerated access apparatus 200 is capable of increasing the data writing rate of the storage system 202.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. An accelerated reading method for an accessing apparatus to rapidly read a plurality of data messages in a storage device, wherein the accessing apparatus comprises a disk river, a processing unit, a buffer unit and a bus driver, the accelerated reading method comprising the steps of:

(a) transmitting a plurality of first request signals and a plurality of second request signals by the disk driver, wherein each of the first request signals has a first address parameter which corresponds an access address of a first data message and has a first address length which represents the size of the first data message, and each of the second request signals has a second address parameter which corresponds an access address of a second data message and has a second address length which represents the size of the second data message;

(b) converting the first request signals into a plurality of first reading commands correspondingly by the processing unit, wherein each of the reading commands has the first address parameter and the first address length correspondingly;

(c) executing the first reading commands by the processing unit for reading the first data messages in the storage device to the disk driver based on the first address parameters and the first address lengths;

(d) reporting a plurality of first statuses by the storage device to the processing unit and storing the first statuses in the buffer unit by the processing unit, wherein each of the first statuses corresponds to the first reading commands and the first data messages respectively to allow the storage device to respond the first request signals correspondingly;

(e) finding the continuation state among the first address parameters and the second address parameter of the first one of the second request signals by the processing unit for determining whether an accelerated reading mode of the storage device starts;

(f1) starting the accelerated reading mode of the storage device when the first address parameters are in the continuation state and the second address parameter of the first one of the second request signals and the first address parameter of the last one of the first request signals is in the continuation state;

(f2) determining the continuation state from the second one of the second address parameters to the last one of the second address parameters, wherein when the current second address parameter and the previous second address parameter are not in the continuation state during the step (f2), the step (f2) further comprises the steps of:
  (f2-1) converting the current second request signal corresponding to the current second address parameter into a fourth reading command by the processing unit, wherein the fourth reading command corresponds to the second address parameter and the second address length of the current second request signal, and the fourth reading command has a fourth reading address length which is equal to the first address length; and
  (f2-2) executing the fourth reading command by the processing unit for reading the second data message in the storage device to be stored in the disk driver based on the second address parameter and the second address length;
(g) converting the first one of the second request signals into a second reading command by the processing unit, wherein the second reading command has a second reading address and a second reading address length correspondingly, and the second reading address length is greater than each of the first address lengths;
(h) executing the second reading command by the processing unit for reading the second data messages in the storage device to be stored in the buffer unit via the bus driver based on the second reading address and the second reading address length, wherein the processing unit responds the second request signals; and
(i) reporting a second status by the storage device to the processing unit and storing the second status in the buffer unit by the processing unit, wherein the second status corresponds to the second reading command and the second data messages respectively.

2. The method of claim 1, after the step (e), further comprising the step (e1) of:
  starting a standard reading mode of the storage device when the second address parameter of the first one of the second request signals and the first address parameter of the last one of the first request signals is not in the continuation state, and starting the standard reading mode further comprising the steps of:
  (e1-1) converting the first one of the second request signals into a third reading command by the processing unit, wherein the third reading command corresponds to the second reading address and the second reading address length, and the third reading command has a third reading address length which is equal to the first address length.
  (e1-2) executing the third reading command by the processing unit for reading the second data message in the storage device to be stored in the disk driver based on the second address parameter and the third reading address length, wherein the processing unit responds the first one of the second request signals; and
  (e1-3) returning to the step (e).

3. The method of claim 1, wherein during the step (f2), each of the second request signals corresponds to each of the second data messages in the buffer unit when the continuation state from the second one of the second address parameters to the last one of the second address parameters is ascertained.

4. The method of claim 3, after the step (f2), further comprising the steps of:
  (j1) transmitting a third request signal by the disk driver, wherein the third request signal has a third address parameter and a third address length;
  (j2) finding the continuation state among the second address parameter of the last one of the second request signals and the third address parameter of the third request signal by the processing unit for determining whether the accelerated reading mode starts continuously; and
  (j3) continuously starting the accelerated reading mode for reading a third data message in the storage device to be stored in the buffer unit based on the third address parameter and responding the third request signal by the processing unit when the continuation state among the second address parameter of the last one of the second request signals and the third address parameter of the third request signal is ascertained.

5. The method of claim 4, after the step (j3), further comprising the step (j4) of: converting the third request signal into a fifth reading command by the processing unit when the second address parameter of the last one of the second request signals and the third address parameter of the third request signal are not in the continuation state wherein the fifth reading command has a fifth reading address and a fifth reading address length, and reading the third data message to be stored in the buffer unit by the processing unit based on the fifth reading address for responding the third request signal wherein the fifth reading length is greater than each of the first address lengths, and returning to the step (j2).

6. The method of claim 4, after the step (j3), further comprising the step (j5): reporting a third status by the storage device to the processing unit and storing the third status in the buffer unit by the processing unit, wherein the third status corresponds to the third data message.

7. The method of claim 1, wherein during the step (e), the processing unit computes the sum of each of the first address parameters and each of the first address lengths correspondingly and determines whether the sum is equal to each of the next first address parameters, and the first address parameters are in the continuation state when the sum is equal to the next first address parameter.

8. The method of claim 1, wherein the second reading address length is equal to the sum of the first address lengths of the first request signals in the continuation state.

9. The method of claim 1, wherein the bus driver reads the first data messages, the first statuses, the second data messages, and the second status based on a universal serial bus (USB) protocol.

10. An accelerated access apparatus for rapidly reading a plurality of data messages in a storage device, the accelerated access apparatus comprising:
  a disk driver, for transmitting a plurality of first request signals and a plurality of second request signals, wherein each of the first request signals has a first address parameter which corresponds an access address of a first data message and has a first address length which represents the size of the first data message, and each of the second request signals has a second address parameter which corresponds an access address of a second data message and has a second address length which represents the size of the second data message;
  a processing unit, for converting the first request signals into a plurality of first reading commands correspondingly, wherein each of the first reading commands has the first address parameter and the first address length correspondingly, for executing the first reading commands for reading the first data messages in the storage device to the disk driver based on the first address parameters and the first address lengths, and for reporting a plurality of first statuses by the storage device to the processing unit and storing the first statuses in the buffer unit by the processing unit wherein each of the first statuses corresponds to the first reading commands and the first data messages respectively to allow the storage device to respond the first request signals correspondingly;

a buffer unit, for storing the first data messages and the second data messages;

wherein the processing unit finds the continuation state among the first address parameters for determining whether an accelerated reading mode of the storage device starts, the processing unit starts the accelerated reading mode of the storage device when the first address parameters are in the continuation state and the second address parameter of the first one of the second request signals and the first address parameter of the last one of the first request signals is in the continuation state, the processing unit converts the first one of the second request signals into a second reading command wherein the second reading command has a second reading address and a second reading address length correspondingly and the second reading length is greater than each of the first address lengths, the processing unit executes the second reading command for reading the second data messages in the storage device to be stored in the buffer unit via the bus driver based on the second reading address and the second reading address length wherein the processing unit responds the second request signals, and the storage device reports a second status to the processing unit and the processing unit stores the second status in the buffer unit wherein the second status corresponds to the second reading command and the second data messages respectively; and wherein the processing unit determines the continuation state from the second one of the second address parameters to the last one of the second address parameters, and when the current second address parameter and the previous second address parameter are not in the continuation state, the processing unit converts the current second request signal corresponding to the current second address parameter into a fourth reading command by the processing unit wherein the fourth reading command corresponds to the second address parameter and the second address length of the current second request signal and the fourth reading command has a fourth reading address length which is equal to the first address length, and the processing unit executes the fourth reading command for reading the second data message in the storage device to be stored in the disk driver based on the second address parameter and the second address length.

11. The accelerated access apparatus of claim 10, wherein the processing unit starts a standard reading mode of the storage device when the second address parameter of the first one of the second request signals and the first address parameter of the last one of the first request signals is not in the continuation state, the processing unit converts the first one of the second request signals into a third reading command wherein the third reading command corresponds to the second reading address and the second reading address length and the third reading command has a third reading address length which is equal to the first address length, and the processing unit executes the third reading command for reading the second data message in the storage device to be stored in the disk driver based on the second address parameter and the third reading address length, wherein the processing unit responds the first one of the second request signals.

12. The accelerated access apparatus of claim 10, wherein each of the second request signals corresponds to each of the second data messages in the buffer unit when the continuation state from the second one of the second address parameters to the last one of the second address parameters is ascertained.

13. The accelerated access apparatus of claim 12, wherein the disk driver transmits a third request signal and the third request signal has a third address parameter and a third address length, the processing unit finds the continuation state among the second address parameter of the last one of the second request signals and the third address parameter of the third request signal for determining whether the accelerated reading mode starts continuously, and the processing unit continuously starts the accelerated reading mode for reading a third data message in the storage device to be stored in the buffer unit based on the third address parameter and responding the third request signal when the continuation state among the second address parameter of the last one of the second request signals and the third address parameter of the third request signal is ascertained.

14. The accelerated access apparatus of claim 13, wherein the processing unit converts the third request signal into a fifth reading command when the second address parameter of the last one of the second request signals and the third address parameter of the third request signal are not in the continuation state wherein the fifth reading command has a fifth reading address and a fifth reading address length, and the processing unit reads the third data message to be stored in the buffer unit based on the fifth reading address for responding the third request signal wherein the fifth reading length is greater than each of the first address lengths.

15. The accelerated access apparatus of claim 13, wherein the storage device reports a third status to the processing unit and the processing unit stores the third status in the buffer unit by wherein the third status corresponds to the third data message.

16. The accelerated access apparatus of claim 10, wherein the processing unit computes the sum of each of the first address parameters and each of the first address lengths correspondingly and determines whether the sum is equal to each of the next first address parameters, and the first address parameters are in the continuation state when the sum is equal to the next first address parameter.

17. The accelerated access apparatus of claim 10, wherein the second reading address length is equal to the sum of the first address lengths of the first request signals in the continuation state.

18. The accelerated access apparatus of claim 10, wherein the bus driver reads the first data messages, the first statuses, the second data messages, and the second status based on a universal serial bus (USB) protocol.

* * * * *